Reissued May 4, 1948

Re. 22,997

UNITED STATES PATENT OFFICE 22,997

POROUS REFRACTORY

Charles J. Kinzie, Youngstown, and Eugene Wainer, Niagara Falls, N. Y., assignors to The Titanium Alloy Manufacturing Company, New York, N. Y., a corporation of Maine No Drawing. Original No. 2,341,561, dated February 15, 1944, Serial No. 335,626, May 16, 1940. Application for reissue November 29, 1946, Serial No. 713,102

7 Claims. (Cl. 106—41)

This invention relates to the production of insulating refractories. More particularly, it relates to the production of porous insulating refractories, especially zircon refractories, bonded with suitable bonding agents. This application is a continuation in part of copending applications Serial No. 204,392, filed April 26, 1938, now abandoned, and Serial No. 256,928, filed February 17, 1939, now Patent No. 2,220,411.

In the past it has been known to construct porous refractories by incorporating with a refractory material a suitable quantity of organic pore-forming material, together with a liquid, to form a homogeneous mass, and then burning out the pore-forming material by firing at a high temperature. Among the pore-forming materials that have been used are cork, sawdust, wood, etc. In the case of many of these refractory materials, the incorporation of such a pore-forming material has been found to decrease the strength to such an extent as to render them commercially of low value. In order to increase the strength of refractory materials, whether porous or non-porous, it is also known to incorporate bonding agents of various kinds. Among the bonding agents which have been used are phosphoric acid, certain double zirconium silicates, certain zirconates, and others. These may be considered as permanent bonding agents, that is, they serve to permanently bond the refractory although the bonding agent itself may in some cases be entirely removed. The green strength of the material, before firing, may be increased by adding such materials as gelatin, which is eliminated in the process of firing and does not permanently bond the base. The permanent bonding agents are in general less refractory, or produce in the course of firing materials which are less refractory, than the refractory base material itself. As many of these highly refractory materials, such as zircon, derive their chief utility from the fact that they will withstand extremely high temperatures, it is obvious that the smaller the quantity of bonding agent while still attaining satisfactory strength, the better will be the final result.

It is therefore an object of this invention to produce materials of high refractoriness, high porosity and high strength. It is another object to increase the refractoriness of such materials without harmfully affecting the porosity and strength, or to increase the strength without harmfully affecting the porosity and refractoriness, or to increase the porosity, without harmfully affecting the refractoriness and strength. Other objects will appear hereinafter.

These objects are accomplished by thoroughly mixing a refractory material, particularly a high temperature refractory material, with a bonding agent and a suitable quantity of liquid to a homogeneous consistency, then subsequently thoroughly mixing an organic pore-forming material with this mixture, shaping the mass, drying and firing at an elevated temperature. It has been found, in accordance with this invention, that the incorporation of the pore-forming material after the remaining ingredients of the mass have been thoroughly mixed with each other, produces greatly improved and unobvious results, as shown hereinafter.

For pore-forming material, there is used any granular organic solid of low or no ash content. Among such materials are cork, wood and coke. Petroleum coke, whether calcined or uncalcined, is a particularly desirable material because of its controllably low ash content and relatively slow rate of burning, which is conducive to accurate control of the process, with the production of a highly uniform product. Coke also has the advantage that it is applicable to ramming and pressing procedures, while cork cannot be permanently pressed because of its elasticity, causing expansion when the pressure is released. In the case of cork, it is preferred to use a material having a relatively slow burning rate, since cork with a fast burning rate tends to eliminate volatile matter so rapidly as to create cracks and fissures during firing. The pore-forming material must be sized within definite limits so as to produce ware containing definite pore size. It must be of a size wholly and considerably coarser than the constituent grains of the refractory mix itself, since pore-forming material of a size in the same range as the grain refractory prevents grain to grain contact of the refractory in the green mix, with almost complete loss of bond on firing, whereas pore-forming material much coarser than the grains themselves allows grain to grain refractory contact resulting in well bonded final ware. For example, where the refractory material is of particle size wholly passing through an 80 mesh screen, pore-forming material no finer than 30 mesh should be used; where the refractory material is of a particle size wholly passing through a 200 mesh screen, pore-forming material no finer than 70 mesh be used.

For refractory material zircon is preferably used because of its high refractoriness. Other suitable high temperature refractories comprise silicon carbide, refractory aluminum oxide, mullite, sillimanite, chromite, olovine, forsterite, quartz or other forms of refractory silica, refractory clays, electrically fused zirconia, talc, feldspar, beryl, rutile, kaolin, spinel, kyanite, thorium oxide, thorite, ceria, andalusite, baddeleyite, porcelain. This list may be further expanded by the use of either synthetic or natural minerals, uncalcined, or in the raw state, or in the precalcined state. With silicon carbide the so-called fire-sand, which is silicon carbide containing some incompletely combined silica, may be used. The refractory aluminum oxides include bauxite, raw or precalcined, gibbsite, and corundum, or synthetic fused aluminum oxide. Olivine is used raw or calcined sufficiently to form forsterite. Quartz is used in the form of sand, crushed ganister, or as calcined quartz which has been previously and suitably heated above 1470° C. so as to form cristobalite. The refractory clays include the various types of non-plastic fireclays, the flint clays, the kaolins, etc. These refractory materials may be used alone, in combination with each other, or in combination with zircon, after transforming same into the proper physical state for casting. Either milled or granular refractory material, or a mixture thereof, may be used, although milled material or a mixture of milled and granular material is preferred.

For permanent bonding agent, a considerable variety of materials may be used. An excellent bond for zircon ware is phosphoric acid ($H_3PO_4$), which bonds even coarse zircon grains very tightly at low temperatures, and excellent porous ware can be made by the use of phosphoric acid alone as a bond. However, the use of $H_3PO_4$ alone as a bond suffers from the serious disadvantage in the high temperature range, since $P_2O_5$ becomes volatile below 3000° F. and results in a pronounced permanent weakening of the structure unless the refractory is composed entirely of finely milled material. Preferred bonding agents, either with zircon or with other refractory materials, are double silicates of zirconium and certain other metals, and certain zirconates, as disclosed and claimed in Reissue Patent No. 21,224 and copending applications Serial Nos. 256,928, now Patent No. 2,220,411, and 329,524, now Patent No. 2,220,412, especially when used in conjunction with phosphoric acid. Other bonding agents that may be used are those disclosed and claimed in copending application to Wainer and Hake, Serial No. 285,580, now Patent No. 2,267,772. To secure the best results, milled bonding agents are preferred.

Any of the standard organic binders may be used to produce green strength. It has been found that a 5% gelatin solution is the best for general usage, particularly for zircon ware.

The amounts of these various materials may be varied within quite wide limits. The amount of bonding agent should be kept as low as possible and still secure the desired strength, both because the bonding agents used are generally more expensive than the refractory base, such as zircon, and because they are less refractory than materials such as zircon. In general, the refractory base should comprise a major portion (i. e. at least 50%) by weight of the entire mass prior to the addition of pore-forming material. When using a combination of phosphoric acid and the zirconates or double silicates of zirconium and another metal, as disclosed in Reissue Patent No. 21,224 and copending applications Serial Nos. 256,928, now Patent No. 2,220,411, and 329,524, now Patent No. 2,220,412, as the bonding agent, it has been found that less than 10 parts by weight of $H_3PO_4$ and less than 15 parts by weight of zirconate or double silicate per 100 parts of refractory base is adequate for most purposes, although more may be used if desired.

The phosphoric acid is ordinarily in solution form, and this, together with gelatin solution or other agent to secure green strength, and water, if desired, comprises the liquid portion of the mass. Sufficient total liquid is employed to secure the proper consistency, which may vary from a viscous slurry to a paste, depending upon the molding procedure to be used, such as ramming, pressing, molding or other desired method of shaping. The presence of the gelatin solution increases the viscosity of a mass which would otherwise be quite fluid.

All the above ingredients (refractory base, bonding agent, aqueous liquid, and green strength bonding agent, if desired), except the pore-forming material, are first thoroughly mixed together until a homogeneous mixture, substantially without lumps, is formed. The pore-forming material is then "folded in" or mixed with the mass to a uniform consistency. The amount of pore-forming material depends upon the porosity desired. In practice, it has been found that a porosity of 70 to 75% of total volume is most suitable and in this case the pore-forming material and other materials removed during firing will comprise from 70 to 75% of the volume of the entire mass. The weight of pore-forming material will of course depend upon its density. In the case of calcined coke with a zircon refractory, approximately 3 parts by weight of zircon to 1 to 2 parts by weight of coke has been found suitable.

The mass is next molded into the required shape, allowed to dry, and is then ready for firing. In order to burn out the pore-forming material as thoroughly as possible, the firing is preferably carried out under good oxidizing conditions.

Having described the invention we now give the following examples of specific modes of operation.

Example 1

1000 grams of −200 mesh purified zircon, 500 grams of −80 mesh purified zircon sand, 35 cc. of 87% $H_3PO_4$ solution (sp. gr. 1.71) and 125 cc. of 5% gelatin solution are thoroughly mixed together to a homogeneous consistency. 500 grams of −10+30 mesh calcined petroleum coke are then mixed therewith until distributed evenly throughout the mass. The mass is then shaped under pressure, dried and fired in accordance with standard refractory procedure in a good oxidizing atmosphere to 1800° F. When temperatures above 2800° F. are used the $P_2O_5$ will slowly distill off so as to leave the residual zircon tightly bonded in the form of a cellular brick. The above mix produces ware of 70 to 75% porosity and is suitable for the temperature range 2600° F. to 4000° F. It weighs approximately one-half that of a similarly sized brick from which the coke is omitted.

Example 2

1500 grams of −200 mesh purified zircon, 50 cc. of 87% $H_3PO_4$ solution (sp. gr. 1.71) and 150 cc. of 5% gelatin solution are thoroughly mixed together to a homogeneous consistency. 500 grams of −40+70 mesh calcined petroleum are then mixed therewith, and the mass subsequently treated as in Example 1.

Examples 3–19

In the following Examples 3–19, all the ingredients except the coke are thoroughly mixed together to a homogeneous consistency. The coke is then mixed therewith until evenly distributed throughout the mass. The mass is then shaped under pressure, dried and fired in accordance with standard refractory procedure in a good oxidizing atmosphere to 1800° F. (Examples 1–12, 18) or 2400° F. (Examples 13–17, 19). These mixes produce ware of 70 to 75% porosity, and are suitable for the 2600° to 4000° F. range. The table below shows the quantities and kinds of ingredients in the various examples.

| Example No. | −80 mesh zircon | −200 mesh zircon | 87% $H_3PO_4$ solution (sp. gr. 1.71) | Other bonding agent (see below for kind) | 5% gelatin solution | 500 grams calcined petroleum coke (size in mesh) |
|---|---|---|---|---|---|---|
| | *Grams* | *Grams* | *Cc.* | *Grams* | *Cc.* | |
| 3 | 1,000 | 500 | 35 | 20 | 90 | −10+30 |
| 4 | -------- | 1,500 | 50 | 20 | 160 | −40+70 |
| 5 | 1,000 | 500 | 35 | 45 | 110 | −10+30 |
| 6 | -------- | 1,500 | 50 | 45 | 180 | −40+70 |
| 7 | 1,000 | 500 | 35 | 30 | 90 | −10+30 |
| 8 | -------- | 1,500 | 50 | 30 | 160 | −40+70 |
| 9 | 1,000 | 500 | 35 | 30 | 95 | −10+30 |
| 10 | -------- | 1,500 | 50 | 30 | 160 | −40+70 |
| 11 | 1,000 | 500 | 35 | 30 | 90 | −10+30 |
| 12 | 1,000 | 500 | 35 | 75 | 110 | −10+30 |
| 13 | 1,000 | 500 | -------- | 30 | 130 | −10+30 |
| 14 | 1,000 | 500 | -------- | 60 | 150 | −10+30 |
| 15 | 1,000 | 500 | -------- | 45 | 130 | −10+30 |
| 16 | 1,000 | 500 | -------- | 45 | 140 | −10+30 |
| 17 | 1,000 | 500 | -------- | 45 | 130 | −10+30 |
| 18 | 1,000 | 500 | 40 | 30 | 95 | −10+30 |
| 19 | 1,000 | 500 | -------- | 40 | 150 | −10+30 |

The "other bonding agent" in Examples 3, 4 and 13 may be milled sodium zirconium silicate, potassium zirconium silicate or lithium zirconium silicate; in Examples 5, 6 and 14 it is milled calcium zirconium silicate; in Examples 7, 8 and 15 it may be milled barium zirconium silicate, magnesium zirconium silicate, zinc zirconium silicate or a fired equimolecular mixture of clay and zirconia powder; in Examples 9, 10 and 16 it is a 4 to 1 milled mixture of calcium zirconium silicate, with either sodium zirconium silicate, potassium zirconium silicate, lithium zirconium silicate, zinc zirconium silicate, barium zirconium silicate or magnesium zirconium silicate; in Examples 11 and 17 it is milled $TiO_2$ or $SnO_2$; in Example 12 it is milled $ZrO_2$ or $ThO_2$; in Examples 18 and 19 it may be the zirconate of either lithium, sodium, potassium, calcium, magnesium, zinc or barium.

Example 20

50 parts of −35 mesh refractory material (zircon, quartz, aluminum oxide, silicon carbide, rutile, fused zirconium dioxide, mullite, sillimanite, olivine, forsterite, chromite, refractory clay, kaolin, beryl, spinel, kyanite, thorium oxide, thorite, ceria, feldspar, andalusite, talc, baddeleyite, porcelain, raw or synthetic, calcined or uncalcined, or mixtures thereof), 44 parts of −200 mesh milled refractory material as above, 8 parts of 87% $H_3PO_4$ solution (sp. gr. 1.71) 5 to 10 parts of calcium zirconium silicate or other bonding agent, 15 to 20 parts of water and 1 part of oxalic acid (which may be omitted if desired) are thoroughly mixed to a homogeneous consistency. 500 grams of this mass is then mixed with 500 cc. of −10+20 mesh granular coke, cork or wood until the latter is evenly distributed throughout the mass. The mass is then shaped, dried and fired to 1800° to 2400° F., depending upon the refractory used and the degree of refractoriness desired.

Example 21

94 grams of −200 mesh milled refractory as in Example 20, 10 parts of 87% $H_3PO_4$ solution (sp. gr. 1.71), 5 to 10 parts of bonding agent, 15 to 25 parts of water and 1 part of oxalic acid (which may be omitted if desired) are thoroughly mixed to a homogeneous consistency. 500 grams of this mass is then mixed with 500 cc. of −10+20 mesh granular coke, cork or wood, and then treated as in Example 20.

Example 22

3000 grams of −200 mesh zircon, 90 grams of sodium zirconium silicate and 550 cc. of 5% gelatin solution were thoroughly mixed to a homogeneous consistency and screened through a 20 mesh screen. 2400 cc. of cork were then mixed therewith until uniformly distributed throughout the mass with the formation of a smooth paste. The mass was then shaped into the form of a brick, dried and fired to 2500° F.

Refractory materials prepared in accordance with the present invention have been observed to exhibit strengths which were quite unexpected, as compared with similar refractory materials prepared by mixing all the ingredients at the same time, including the pore-forming material. This may be accounted for in part by the fact that the pore-forming material partially prevents intimate contact between the bonding agent and the refractory base, if it is added before the refractory base and bonding agent are thoroughly intermingled. For comparative purposes, refractory bricks were constructed as follows, following the procedure of Example 22 as closely as possible except for the time at which the pore-forming material was added.

*A*

3000 grams of −200 mesh zircon, 90 grams of sodium zirconium silicate, 550 cc. of 5% gelatin and 2400 cc. of cork, all from the same batch as in Example 22, were thoroughly mixed to a homogeneous consistency and screened through a 20 mesh screen. This was shaped into a brick with difficulty. The mass was rammed so as to secure approximately the same density as in Example 22. The mass was dried for the same period of time as in Example 22 and was then fired simultaneously and side by side in a furnace with the brick of Example 22 and for the same period of time.

*B*

The same procedure was followed as in A except that the ramming was omitted.

The brick of Example 22 and brick A were of approximately the same density, but were both about 1.6 times as dense as brick B. Certain strength tests were then applied to all three bricks. The cross-breaking and crushing tests used were the same or patterned after the recommended procedures of the A. S. T. M., except that, due to the small size of the testing equipment, a smaller test specimen was used throughout (for test procedures see 1939 Book of A. S. T. M. Standards, part II, Non-metallic materials—constructional, page 198).

The cross-breaking test equipment is provided with suitable bearings so that full contact is made with the specimen at all times. A specimen 4½ inches long by 1 inch wide by 1 inch deep is used. The specimen is positioned on the bearings exactly as pictured on page 200 of the above reference. The load is applied to the top knife edge by means of a lever arm, and the load continually increased by pouring sand into a bucket held by the lever arm at a specified position on said arm.

The modulus of rupture (cross-breaking strength) in pounds per square inch is reported as calculated by the following formula:

$$R=\frac{3Wl}{2bd^2}$$

where

R=modulus of rupture in pounds per square inch
W=total load in pounds at which specimen failed
$l$=distance between support in inches
$b$=width of specimen in inches
$d$=depth of specimen in inches By means of the above test the modulus of rupture of the three test bricks are as follows:

Example 22=3120 pounds per square inch
A=2250 pounds per square inch
B=1710 pounds per square inch The crushing strength was determined using the familiar recording Carver Laboratory hydraulic press. A bearing block was used for perfect positioning of the specimen as shown on page 199 of the above reference. Check runs were made on specimens varying in cross sectional area from 0.75 in.$^2$ to 16 in.$^2$. Load was impressed at the rate of about 1000 pounds per minute, loading being stopped at first instance of failure.

The cold crushing strength in pounds per square inch was calculated from the formula:

$$S=\frac{W}{A}$$

where

S=cold crushing strength in pounds per square inch
W=total load indicated by testing machine
A=average of the gross areas of top and bottom of the specimen, in square inches, of the section of the specimen perpendicular to the line of application of the load.

By means of the above test the cold crushing strengths of the three bricks are:

Example 22=2170 pounds per square inch
A=320 pounds per square inch
B=63 pounds per square inch The invention and the advantages thereof having been described, it is understood that it is not intended to be limited, except as defined in the appended claims.

We claim:

1. The method of making a refractory structure of high porosity which comprises thoroughly mixing a refractory base with a permanent bonding agent including a double silicate of zirconium and a metal taken from the group consisting of lithium, sodium, potassium, magnesium, calcium, barium and strontium in the presence of an aqueous liquid, subsequently adding to the batch a granular organic solid, shaping the mass, drying and firing at an elevated temperature.

2. The method of making a refractory structure of high porosity which comprises thoroughly mixing a refractory base with a permanent bonding agent including phosphoric acid and a double silicate of zirconium and a metal taken from the group consisting of lithium, sodium, potassium, magnesium, calcium, barium and strontium and a green strength bonding agent in the presence of an aqueous liquid, subsequently adding to the batch a granular organic solid, shaping the mass, drying and firing at an elevated temperature.

3. The method of making a refractory structure of high porosity which comprises thoroughly mixing zircon with a permanent bonding agent in the presence of an aqueous liquid, subsequently adding to the batch a granular organic solid, shaping the mass, drying and firing at an elevated temperature.

4. The method of making a refractory structure of high porosity which comprises thoroughly mixing zircon with a permanent bonding agent in the presence of an aqueous liquid, subsequently adding to the batch a granular organic solid having particle sizes larger than the particle sizes of said zircon and said bonding agent, shaping the mass, drying and firing at an elevated temperature under good oxidizing conditions.

5. The method of making a refractory structure of high porosity which comprises thoroughly mixing zircon with a permanent bonding agent including a double silicate of zirconium and a metal taken from the group consisting of lithium, sodium, potassium, magnesium, calcium, barium and strontium in the presence of an aqueous liquid, subsequently adding to the batch a granular organic solid, shaping the mass, drying and firing at an elevated temperature.

6. The method of making a refractory structure of high porosity which comprises thoroughly mixing zircon with a permanent bonding agent including phosphoric acid and a double silicate of zirconium and a metal taken from the group consisting of lithium, sodium, potassium, magnesium, calcium, barium and strontium and a green strength bonding agent in the presence of an aqueous liquid, subsequently adding to the batch a granular organic solid, shaping the mass, drying and firing at an elevated temperature.

7. The method of making a refractory structure of high porosity which comprises thoroughly mixing zircon with a permanent bonding agent including phosphoric acid and a double silicate of zirconium and a metal taken from the group consisting of lithium, sodium, potassium, magnesium, calcium, barium and strontium and a green strength bonding agent in the presence of an aqueous liquid, subsequently adding to the batch a granular organic solid having particle sizes larger than the particle sizes of said zircon and said bonding agent, shaping the mass, drying and firing at an elevated temperature under good oxidizing conditions.

CHARLES J. KINZIE.
EUGENE WAINER.